Nov. 4, 1958  L. D. FUNK  2,858,648
ELECTRIC INJECTOR FOR LIQUID FERTILIZER AND METHOD
OF TREATING IRRIGATION WATER THEREWITH
Filed April 14, 1955  5 Sheets-Sheet 1

Lewis D. Funk
INVENTOR.

BY
Attorneys

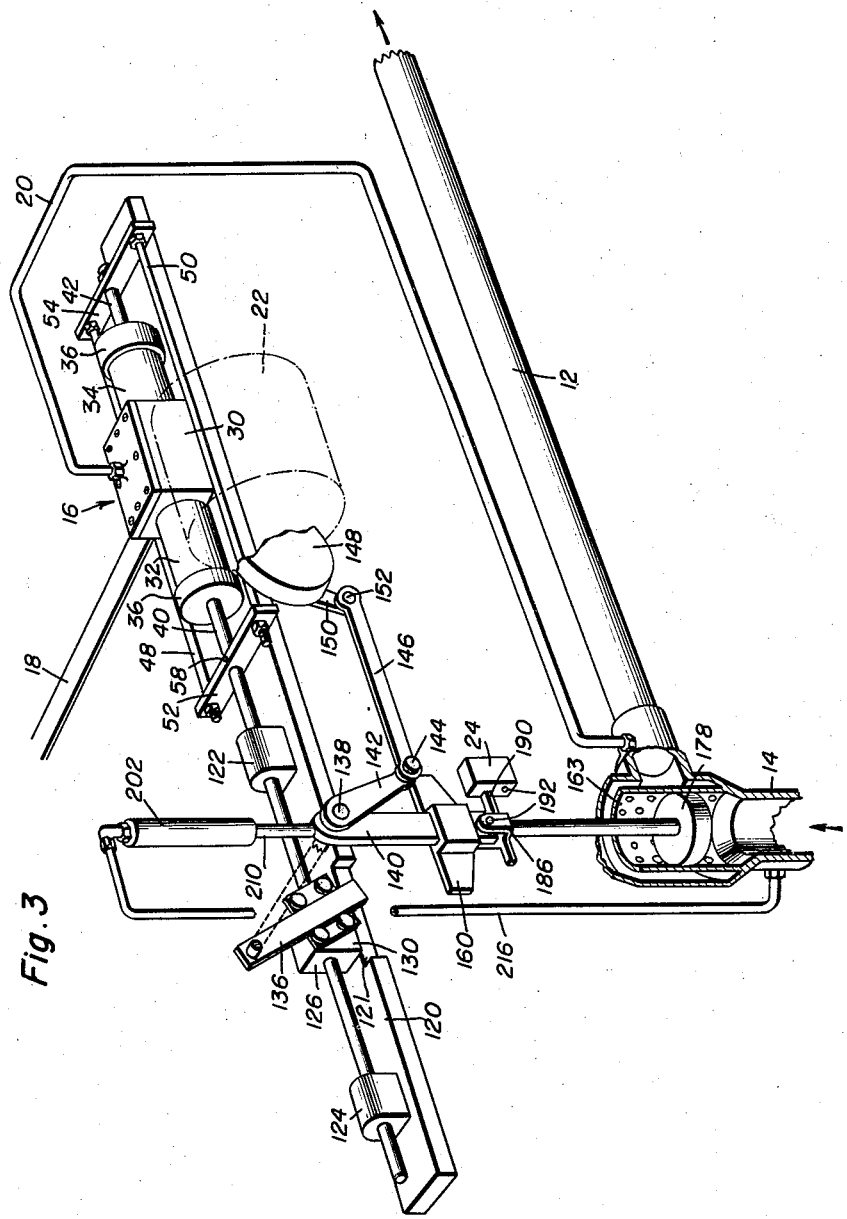

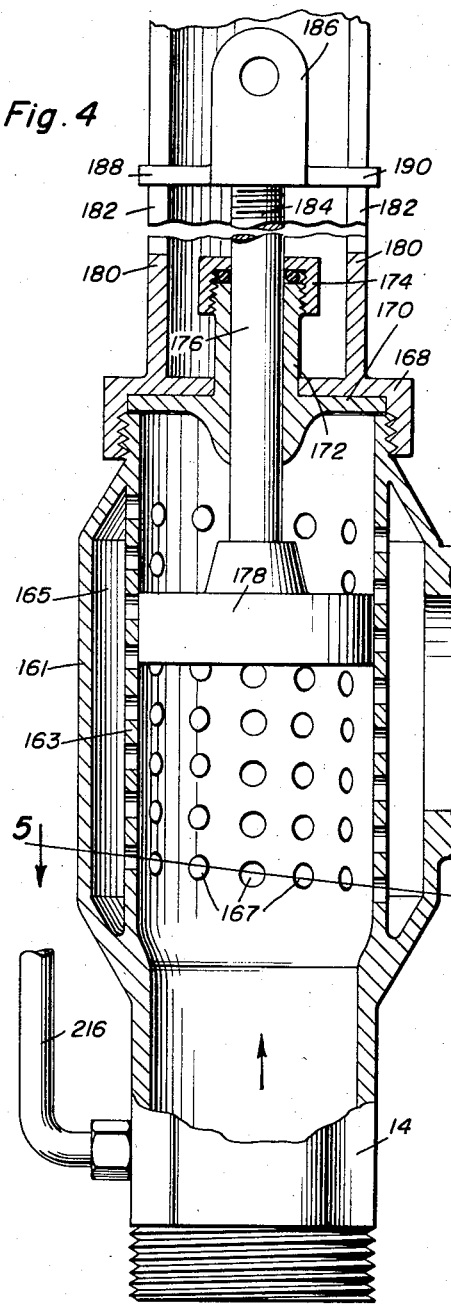
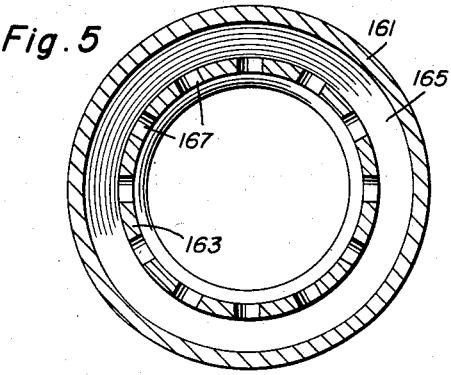
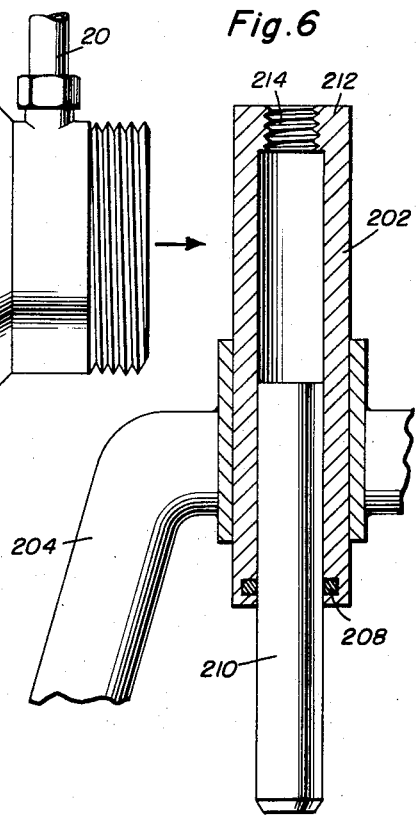
Lewis D. Funk
INVENTOR.

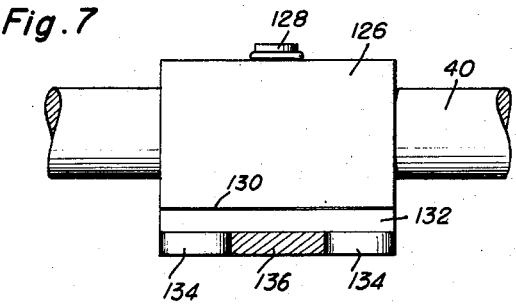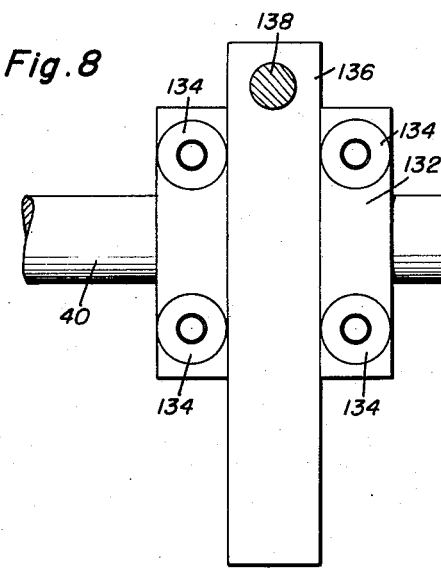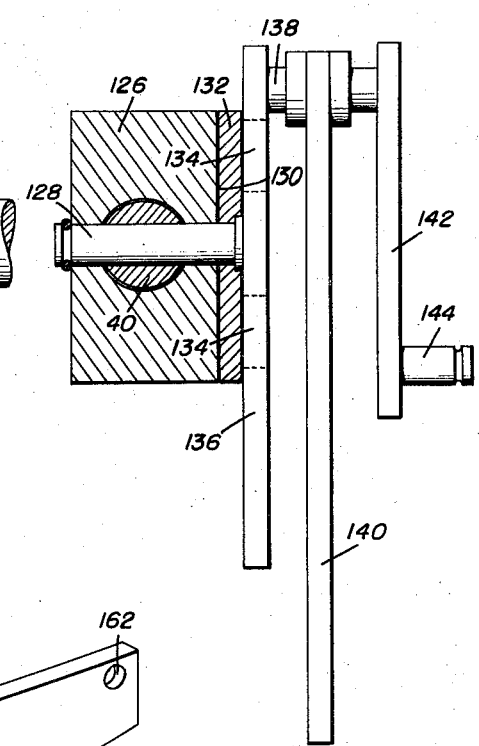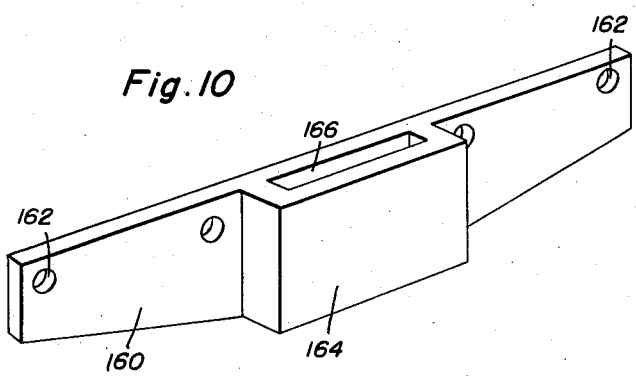

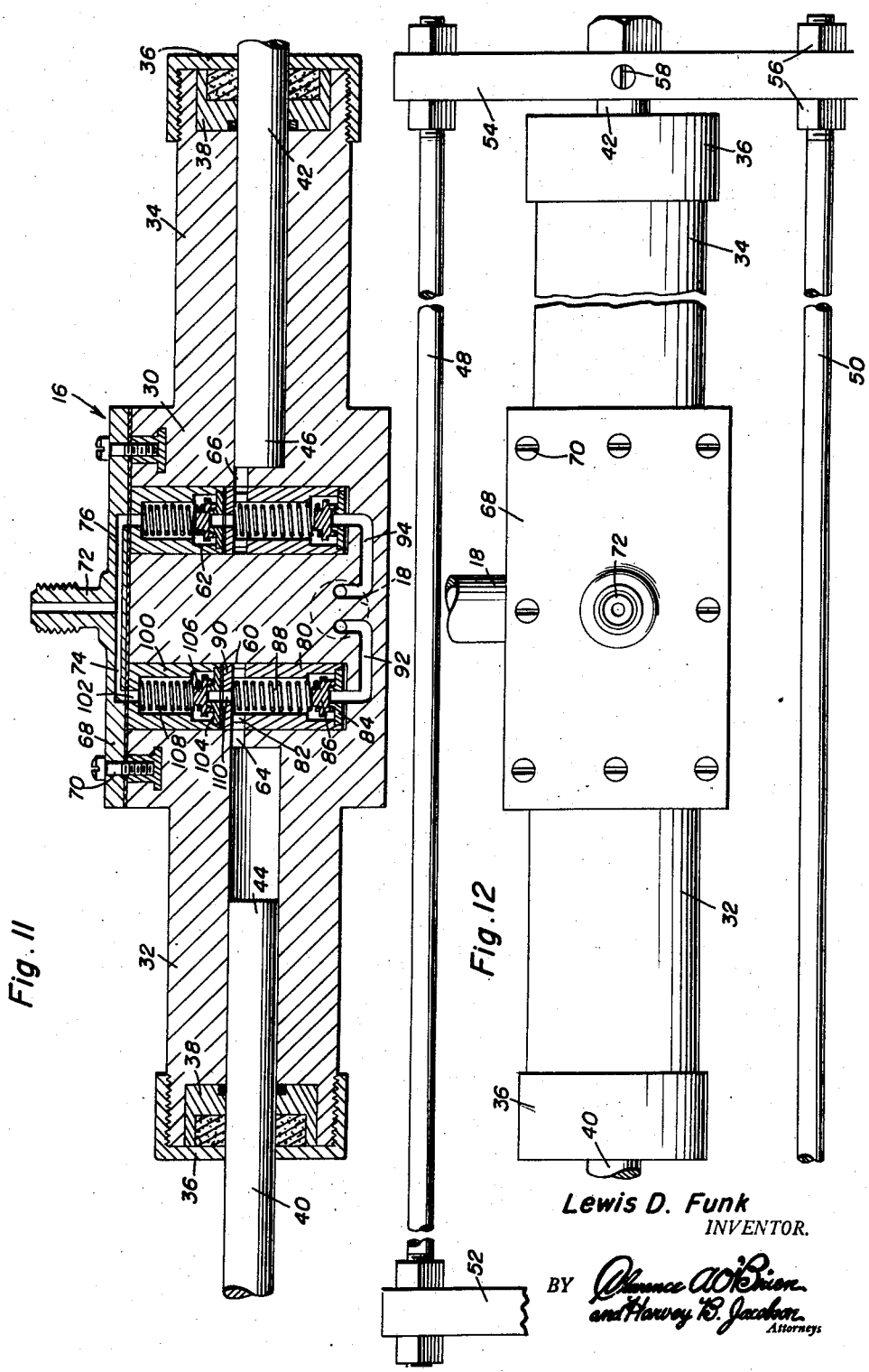

United States Patent Office 2,858,648
Patented Nov. 4, 1958

2,858,648

ELECTRIC INJECTOR FOR LIQUID FERTILIZER AND METHOD OF TREATING IRRIGATION WATER THEREWITH

Lewis D. Funk, Whittier, Calif.

Application April 14, 1955, Serial No. 501,335

10 Claims. (Cl. 47—58)

This invention comprises novel and useful improvements in an electric injector for liquid fertilizer and more specifically relates to an apparatus and method for automatically injecting liquid fertilizer into an irrigation system in proportion to the rate of flow therein.

The principal object of this invention is to provide an apparatus for automatically supplying a liquid fertilizer to an irrigation system such as that employed for permanent installation for greenhouses, groves or orchards or for any use employing a sprinkler system.

An important object of the invention is to provide an apparatus whereby liquid fertilizer may be automatically injected into an irrigation system at a fixed ratio or proportion relative to the flow of water in the irrigation system.

A further object of the invention is to provide an apparatus in conformity with the foregoing object which shall be completely automatic in its operation whereby the quantity of the fertilizer injected may be varied in accordance with and by means of variations in the flow of water in the irrigation system to thereby maintain a constant proportion of fertilizer to the irrigation water.

Yet another object of the invention is to provide an automatic apparatus in accordance with the foregoing objects in which the initiation of the injection of the liquid fertilizer and the termination of its injection shall be automatically controlled by even relatively low rates of flow of the water in the irrigation system, as for example beginning or ceasing the injection when the rate of the flow of water exceeds or drops below a flow of less than one gallon per minute.

A further object of the invention is to provide a liquid fertilizer injection apparatus in conformity with the above-mentioned objects in which the rate of injection of the fertilizer is controlled by varying the stroke of the injection pump, while maintaining the speed of operation of the injection pump at a substantially constant rate.

Yet another object of the invention is to provide an injection system in conformity with the preceding objects wherein an improved means, obviating the use of springs, is employed to discontinue operation of the motor of the injection device when the flow of liquid in the irrigation system drops below a predetermined minimum rate.

And a final important object of the invention to be specifically enumerated herein resides in the provision of an apparatus as set forth in the above-mentioned objects wherein a mechanism responsive to flow in the irrigation system may simultaneously control distorting or stopping of the operating means of the injection pump; and may vary the stroke of the injection pump in order to vary the introduction of the liquid fertilizer into the irrigation system.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a diagrammatic view showing more clearly the automatic control mechanism of the assembly of Figure 1;

Figure 4 is a vertical sectional view, parts being broken away and parts shown in section, and upon an enlarged scale, of the flow responsive controller of the injector;

Figure 5 is a horizontal sectional view taken substantially upon the plane indicated by the section line 5—5 of Figure 4;

Figure 6 is a detail view taken upon an enlarged scale and generally in vertical section of a hydraulic cylinder and piston forming a part of return means for the flow responsive controller;

Figure 7 is a fragmentary detail view taken partly in top plan and partly in horizontal section of a portion of the connection of the injector pump actuating mechanism;

Figure 8 is a fragmentary front elevational view of the arrangement of Figure 7;

Figure 9 is a fragmentary vertical transverse sectional view through a portion of the injector pump actuating mechanism;

Figure 10 is a perspective view of a guide member forming a part of the injector actuating mechanism;

Figure 11 is a vertical central sectional view through the liquid injection pump of the invention; and Figure 12 is a fragmentary top plan view, parts being broken away, of the injector device of Figure 11.

In general, the present invention aims to provide an apparatus whereby the growth of plants may be nourished and stimulated by supplying liquid fertilizer thereto through the mixing of the liquid fertilizer with the irrigation water at a constant proportion, in order that the irrigation system for the plans may also serve to supply nourishment thereto. The present invention is particularly applicable to such irrigation systems as are employed, usually as permanent installations, in greenhouses, nurseries, groves or orchards and the like. An important feature of this invention resides in the provision of an apparatus which may be easily applied either as a permanent component of or as a temporary attachment for an irrigation system, and when so applied, will be entirely automatic in maintaining a constant proportion of liquid fertilizer to the irrigation water delivered by the irrigating system.

It is an important feature of the invention that the liquid fertilizer injection apparatus of this invention shall be controlled by the flow of water in the irrigation system and shall be responsive to variations in such flow, for the dual purposes of initiating or halting the injection of the liquid fertilizer at predetermined rates of flow and further for varying the rate of the injection of the liquid fertilizer in accordance with the rate of flow through the irrigation system.

Figure 1:
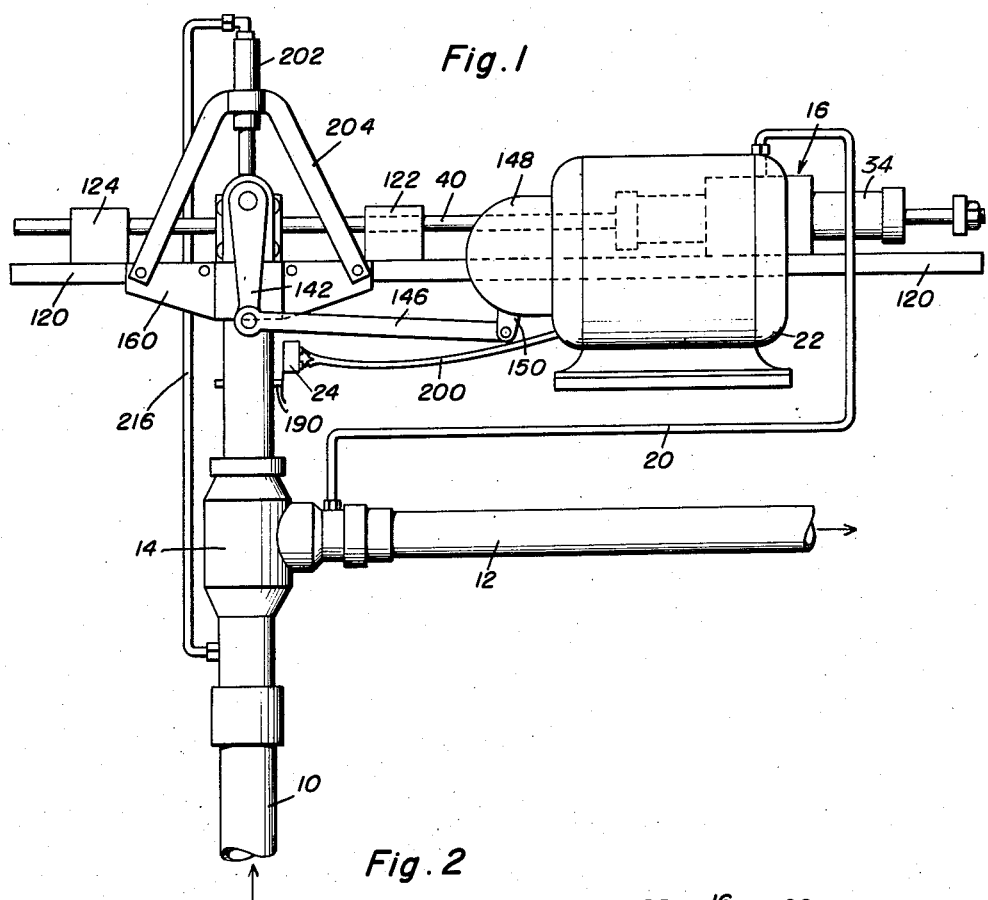
Figure 1 is a fragmentary elevational view showing a portion of an irrigation system with the liquid fertilizer injector of this invention applied thereto.

Referring first to Figures 1 and 3 it will be seen that the liquid fertilizer injector of this invention has been applied to a portion of the conduits 10 of any conventional irrigation system, the flow of water through the conduits being in the directions indicated by the arrows in Figures 1 and 3. The conduits 10 and 12 for the purposes of this invention are connected by a fitting 14 which fitting is of a novel construction and is particularly adapted for cooperation with the liquid injector device of this invention. Indicated generally by the numeral 16 is a liquid injector pump injecting liquid fertilizer, the same being supplied by means of an inlet pipe 18 with liquid fertilizer of any desired type from any suitable source, a discharge pipe 20 delivering the liquid fertilizer in accurately controlled quantities and rates of flow from the injector unit 16 into the conduit 12 on the downstream side of the fitting 14, whereby the liquid fertilizer will mix with the irrigation water flowing through the conduit of the irrigation system. An electric motor 22 is utilized to operate the actuating mechanism of the injector pump unit 16, this motor being controlled by a micro-switch 24. A flow responsive controller operates the micro-switch which in turn controls the actuation of the electric motor 22, whereby the electric motor will operate the injector unit; and the flow responsive controller further varies the stroke of the actuation of the injector unit to thereby control its rate of delivery.

Variable stroke injector pump

Although the principles of this invention are not limited to any particular construction of injector pump unit, the pump construction shown in Figures 11 and 12 is deemed to be particularly satisfactory for the purposes of this invention. As shown in these figures, the injector pump unit 16 includes a central body portion 30 from which extend oppositely disposed pump cylinders 32 and 34, each provided with a removable cylinder head 36, provided with a suitable packing assembly 38 through which is reciprocably disposed a pair of piston rods 40 and 42 whose inner extremities 44 and 46 constitute injector pistons or plungers as set forth hereinafter.

A cross head is provided for reciprocating the plungers in unison in opposite directions in their cylinders. Thus, a pair of parallel rods 48 and 50 are connected at their opposite extremities by cross arms 52 and 54, which are adjustable upon the rods as by means of adjusting nuts 56. At their midportions, the members 52 and 54 are provided with bores through which extend the outer ends of the piston rods 40 and 42, setscrews or the like 58 being provided to rigidly secure the piston rods to the cross head. It will thus be evident that when the cross head is reciprocating, the pistons 44 and 46 will be simultaneously reciprocated, but in relatively opposite directions in the pump cylinders.

The central body portion 30 of the injector pump unit is provided with a pair of transverse bores 60 and 62 which are disposed adjacent the closed, inner ends of the two pump cylinders 32 and 34, these bores communicating therewith as by passages 64 and 66. The bores emerge through one side of the central body portion 30 being closed by a cover plate 68 which is removably secured as by fastening bolts 70. Rising from the cover plate is a threaded nipple 72 adapted to be connected with the above-mentioned liquid fertilizer discharge pipe 20, and passages 74 and 76 formed in the cover plate 68 connect the nipple and the pipe 20 with the two bores 60 and 62.

Disposed in the bores 60 and 62 are the intake and discharge valve assemblies for the two pump cylinders. The intake valve assembly consists of a sleeve 80 having ports 82 at its upper end registering with the ports 64 and 66. At its lower end, the sleeve 80 is provided with a closure plug 84 having an inlet portion which is controlled by the inlet valve 86 which in turn is yieldingly retained against the port as by the valve spring 88 disposed in the sleeve and bearing against the closed upper end 90 thereof. From the previously mentioned liquid fertilizer supply conduit 18, the fertilizer is delivered by means of passages 92 and 94 to the inlet ports of the inlet valve sleeves 80 of the two bores 60 and 62, as will be apparent from Figure 11. Thus, liquid fertilizer is supplied to the inlet valve of each of the two pump cylinders and since the inlet valves are yieldingly retained in closed position, upon the suction strokes of their pump plungers, liquid fertilizer will be drawn into the valve assemblies and by means of the passage 64 into the pumping cylinders.

The discharge valve assemblies of the pump cylinders likewise consist of sleeves 100 which are closed at their upper ends except for discharge passages 102 which communication with the conduit 74, previously mentioned in the detachable plate 68. At their other ends, the sleeves are provided with closure plates or heads 104 which are apertured to provide discharge ports which are likewise closed by discharge valves 106 yieldingly retained in their port closing position by the springs 108 disposed in the sleeves. It will be observed that the upper closed end of the inlet valve sleeve 80 is provided with a port 110 which communicates with the port in the discharge valve assembly head 104 and thus establishes communication between the discharge valve and the injector pump cylinders. In this arrangement it will thus be observed that the intake of the pump is through the inlet valve assembly while the discharge of the pump is through the upper end of the inlet valve assembly and through the exaust or discharge valve assembly.

The valve assembly may be readily serviced by merely removing the valve closure plate 68.

It will thus be apparent that upon reciprocation of the pump pistons 44 and 46, flow of fluid will be alternately drawn from the supply conduit 18 through the two inlet assemblies to the two pump cylinders 32 and 34; and will be alternately discharged from those cylinders through the discharge valve assemblies and the discharge conduits 74 and 76 to the discharge pipe 20. This arrangement permits the employment of a double acting pump for providing a substantially uniform flow of the liquid fertilizer from the injector unit into the irrigation system.

Injector pump actuator

Reciprocation is imparted to the cross head for actuating the injector pump plungers by means of a novel actuating mechanism to be now described. Inasmuch as it is generally more convenient to employ a constant speed electric motor for the source of power for actuating the reciprocating injection pump, it is necessary to vary the output of the pump in order that despite its constant speed of operation, varying quantities of the liquid fertilizer may be injected into the irrigation system in accordance with variations of the rate of flow therethrough and thus maintain a uniform proportion of the fertilizer to the water.

Mounted in any convenient manner is a supporting base 120 upon which is secured the central portion 30 of the injector unit. The cross head bars 52 and 54 are slidable upon this base and the piston rod 40 is elongated to extend through a pair of guides 122 and 124. Intermediate the guides, the piston rod has secured thereto a slide block 126 to which reciprocatory motion is imparted in a manner to be subsequently set forth whereby reciprocation is imparted to piston rod 40, the cross head and the two injector pistons or plungers.

As will be best apparent from Figure 7, the slide 126 is adjustable upon the piston rod 40, being secured in adjusted position thereon as by fastening setscrew or the like 128. Secured to a flat face 130, see Figure 3, of the slide 126 is a pivot plate 132, being pivoted to the slide by the retaining pin 128 by means of which the slide is in turn detachably secured to the piston rod 40. This pivotal connection is shown clearly in Figure 9 and from a comparison of Figures 8 and 3 it will be seen that the pivot plate 132 pivots upon the face 130 upon the slide 126 during operation of the device for a purpose to be subsequently apparent.

Figure 2:
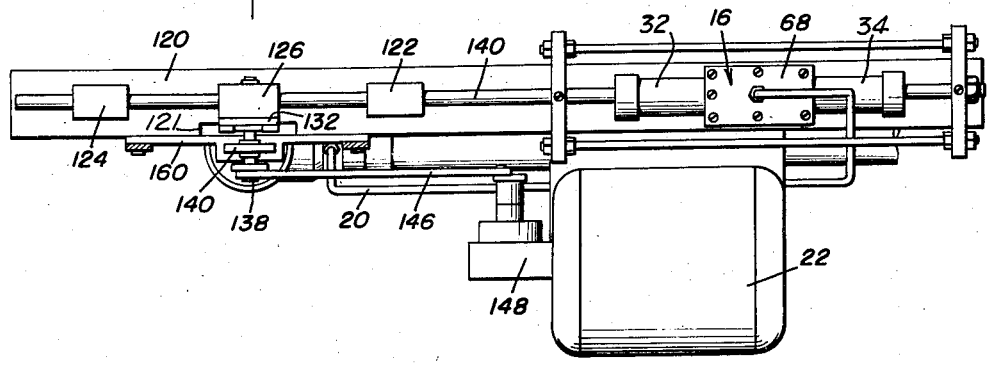
Figure 2 is a top plan view of the arrangement of Figure 1.

Carried by the pivot plate 132 are upper and lower sets of rollers 134 between which rollers is vertically slidable a crank lever 136. At its upper end this crank lever has a crank arm 138, and as shown in Figure 9 an adjusting member or bar 140 is pivoted thereon. Rigidly secured to the end of the crank 138 is the crank arm 142 having in turn a crank 144 thereon to which is attached a connecting rod 146. The side of the base 120 is slotted as at 121, Figures 2 and 3, to provide clearance for the lever 136.

A reduction gear assembly, not shown, but of any conventional type, is housed in a gear casing 148 and is driven by the motor 22, for the purpose of driving a crank arm 150 which in turn is pivoted as at 152 to the end of the connecting rod 146.

As so far described it will now be apparent that actuation of the motor 22 will result in the crank 150 actuating the crank arm 142 and through the crank shaft 138 causing oscillation of the crank lever 136 throughout the axis of the shaft 138. The lever 138, in turn, bearing against the two sets of antifriction rollers 134, will impart reciprocatory motion along the axis of the piston rod 40 for operating the crosshead and consequently the two injector pump plungers.

It is preferred that the crank arm 150 be of lesser length than the crank arm 142, whereby rotation of arm 150 will result in oscillation of the arm 142. Although the cranks 150 and 142 have a fixed stroke, a variable stroke is imparted to the piston rod 40 by extending or shortening the effective length of the crank lever 136 with respect to its engagement with the slide block 126 through the two sets of rollers 134. For that purpose, the member 140 is adjusted vertically to thus shorten or extend the length of the arm 136 and thereby vary the amplitude of the reciprocation imparted thereby the piston rod.

In order to effect this vertical adjustment of the member 140 which thus constitutes an adjustable support for the axis of the crank shaft 138, there is provided a guide bracket 160, see Figure 10, which is suitably mounted or fastened upon the base 120 in any convenient location. This bracket is provided with suitable apertures 162 whereby fasteners may be employed to fixedly secure the bracket in position, and there is provided a slotted boss 164 upon the bracket, having a guide slot 166 through which the member 140 is reciprocable.

Means are provided for raising and lowering the member 140 in order to adjust the stroke of the injector pump. The actuating means for adjusting the member 140 and consequently the stroke of the injector pump is associated with a flow responsive controller in an advantageous manner to be now described.

*Flow responsive controller of the injector pump*

A flow responsive controller is provided which in response to variations in the rate of flow through the irrigation system will start or stop actuation of the injector pump and will vary the stroke and consequently rate of delivery of liquid fertilizer from the injector pump. The flow responsive element of the controller is housed in the fitting 14. Referring particularly to Figure 4 it will be seen that the fitting 14 includes a cylindrically enlarged portion 161 in which is disposed a cylindrical partition 163 leaving an annular chamber 165 therebetween. The partition 163 is of substantially the same diameter as that of the conduit sections 10 and 12. The cylindrical partition is provided with a plurality of apertures or ports 167, these ports being arranged in a spiral, as will be clearly apparent from Figure 4. The upper end of the fitting is provided with a removable closure cap 168 which also retains the flange 170 against the upper end of the fitting in sealed engagement therewith, this flange having a guide bushing 172 whose upper end is provided with a packing seal 174. A rod 176 is slidable through this bushing and carries at its lower end a piston 178. This piston is slidable within the apertured cylindrical partition 163 so that vertical adjustment of the piston will close or mask a varying number of the apertures 167. Conveniently, if desired, the piston 178 may have an upstanding skirt or sleeve in order to close all of the apertures 167 which lie above the bottom face of the piston. In any event, the flow of water in the irrigation system in the direction of the arrows of Figure 4 will produce a force upon the bottom surface of the piston 178. This force will be proportionate to the rate of flow. As the piston is in its lowered position, obviously a fewer number of ports 167 will be uncovered whereby pressure will build up below the piston causing upward movement of the same. This upward movement will continue until a sufficient number of ports have been uncovered to cause the pressures in the two conduit sections 10 and 12 to be substantially equal or at a fixed predetermined ratio with respect to each other, so that the position of the piston 170 will be directly proportional to the rate of flow through the irrigation system.

Extending upwardly from the closure cap 168 are guide members 180 having vertically extending guide slots 182 therein. The upper end of the piston rod 176 is externally threaded as at 184 and a member 186 is screw threadedly engaged thereon. This member has horizontally extending arms 188 and 190 which are guidingly received in the slots 182. The upstanding lug 186 is bifurcated, as will be apparent from Figure 3, to receive the lower end of the adjusting member 140 previously mentioned, the latter being connected to the bifurcations as by means of a pivot pin 192. It will thus be apparent that the member 140 and the piston rod 176 and the piston 178 are caused to move vertically as a unit. Thus, upon actuation of the fluid responsive member 178, the latter in turn will cause vertical movement of the member 140 and thus will adjust vertically the position of the crank shaft 138 and thereby will cause variation of the stroke of the injector plungers as previously mentioned.

Referring now more particularly to Figures 1 and 3 it will be understood that the micro-switch 24 is electrically connected to the electric motor 22 as by an electric cable 200, and to any suitable source of electric current in any suitable manner, not shown. The arm 192 is adapted to actuate the micro-switch 24 and thus control the electric circuit of the motor 22. The arrangement is such that upon a predetermined upward movement of the piston 178 under the influence of a predetermined rate of flow in the irrigation system, the upward travel of the arm 190 will energize the switch and initiate operation of the electric motor and through the motor and its connections will cause oscillation of the lever 136. However, when the crank arm 138 is in its lower-most position, its center will be substantially upon the axis of the pivotal connection 128 of the lever with the slide block, whereby oscillation of the lever will merely result in pivoting of the block and will not result in reciprocation of the piston rod 40 or of the crosshead assembly. However, as the rate of flow increases beyond that amount necessary to energize the electric motor, continued upward travel of the piston will in turn render the crank arm 136 of varying effective length as the crank shaft 138 is moved at an increasing distance from the axis of the pivot pin 128. Thus, as the rate of flow through the irrigation system increases, the stroke of the injector will also be increased by the lengthening of the crank arm 136. By this means, the rate of delivery of the injector pump assembly is increased in proportion to increase in the rate of flow through the irrigation system. Obviously, the rate of increase of injection may be so calibrated as to maintain a fixed proportion of the liquid feritilizer supplied to the irrigating water; or may be varied at a predetermined rate with respect thereto.

Provision is made for positively decreasing the rate of injection as the rate of flow through the irrigation system diminishes; and to de-energize the electric motor when the rate of flow drops below a predetermined minimum. For this purpose, there is provided a hydraulic cylinder 202 which is mounted by a supporting bracket 204 upon the previously mentioned guide bracket 160. As will be best apparent from Figure 6, the cylinder 202 is provided with a suitable packing member 208 at its lower end through which is slidably received an actuated plunger 210. Its upper end is provided with a cylinder head 212 having an internally threaded bore 214 which communicates with a conduit 216. As shown in Figures 1, 3 and 4, the conduit 216 communicates with the fitting 14 below or upon the upstream side of the perforated cylindrical partition 163. Thus, the fluid pressure prevailing in the irrigation system conduit 10 or the fitting 14 below the piston 178 is applied to the plunger 210 to cause the latter to press downwardly upon the upper end of the adjusting member 140.

It will be observed that the area of the plunger 210 is considerably less than that of the piston 178 whereby the latter can easily override the downward pressure imposed by the plunger 210 upon the top of the adjusting member 140, and force the latter upwardly in response to variations in flow in the irrigation system conduits. However, when this flow drops below a predetermined value, the substantially constant pressure in the conduit 10 will produce a constant force upon the conduit 219 tending to restore the adjusting member 140 to its lowered position thereby reducing the stroke of the injector unit and re-lowering the piston 178 and eventually causing the arm 190 to de-activate the micro-switch 24.

From the foregoing it will be apparent that an apparatus has been provided which is completely automatic in its operation and will respond to the rate of flow through an irrigation system for introducing a liquid fertilizer thereinto. When the flow is cut off through the irrigation system by the main control valve, not shown, the standing pressure therein, applied to the plunger 210, will maintain by this pressure the actuating mechanism of the injector unit in a no stroke position; and will de-energize the electrical connections of the motor 22. When the main valve in the irrigation system is open however, and the flow therethrough reaches a predetermined minimum, such as about or slightly less than one gallon per minute, the piston 178 will be moved upwardly to first actuate the micro-switch and start operation of the motor and of the crank shaft 138; and upon further increase in the rate of flow will then adjust the stroke of the injector unit from zero to a maximum. Therefore, it is merely necessary to control the rate of flow through the irrigation system by the conventional method, and there will be produced an automatic calibrated supply of liquid fertilizer thereto.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An injector for liquid fertilizer for use with an irrigation system having an irrigation conduit, comprising; a variable capacity pump having a constant rate of operation, liquid intake means connected to said pump, means connected to said pump for delivering liquid from said pump into an irrigation conduit, means operatively associated with said conduit and responsive to flow through said conduit and operatively connected to said pump for controlling the delivery capacity of said pump, and further means operatively associated with said conduit and responsive to flow through said conduit for controlling the duration of the actuation of said pump.

2. An injector for liquid fertilizer for use with an irrigation system having an irrigation conduit, comprising; a variable delivery capacity pump having a constant rate of operation and a variable stroke, liquid intake means for said pump, means for delivering liquid from said pump into an irrigation conduit, means responsive to flow through said conduit for controlling the delivery capacity of said pump by variation of its stroke, said last means including a member located in and exposed to the fluid in said conduit and movable by the flow of the latter.

3. An injector for liquid fertilizer for use with an irrigation system having an irrigation conduit, comprising; a variable delivery capacity pump having a constant rate of operation and a variable stroke, liquid intake means for said pump, means for delivering liquid from said pump into an irrigation conduit, means responsive to flow through said conduit for controlling the delivery capacity of said pump by variation of its stroke, said pump having at least one piston reciprocable in a pump cylinder, operating means for causing positive reciprocation of said piston, means for adjusting said operating means for varying the stroke of said piston, said flow responsive means being operatively connected to said stroke varying means.

4. A method of fertilizing plants comprising irrigating the plants by supplying irrigating water thereto through an irrigation conduit, introducing by a pump having a constant speed of operation a liquid fertilizer into the irrigation water in the conduit, beginning the introduction of the fertilizer when the flow of the irrigating water in the conduit exceeds a predetermined rate, thereafter varying by varying the delivery capacity of the constant speed pump the rate of introduction in proportion to variations in the flow of the irrigating water above said predetermined rate.

5. The method of claim 4 including the step of halting introduction when the flow of the irrigating water decreases from said predetermined rate.

6. A liquid fertilizer injector for irrigation systems having an irrigation conduit comprising; a variable capacity reciprocating piston injection pump having a constant rate of operation, liquid intake means for said pump, liquid discharge means for said pump communicating with said conduit, a source of power for said pump, operating means connecting said source of power to said pump, means responsive to variations in flow in said conduit for controlling the time of actuation of said source of power.

7. The combination of claim 6 wherein said operating means includes a stroke varying means for said reciprocating piston pump, said member being operatively connected to said stroke varying means for varying the stroke of the pump in response to variations of flow in said conduit.

8. The combination of claim 6 wherein said operating means includes a stroke varying means for said reciprocating piston pump, said member being operatively connected to said stroke varying means for varying the stroke of the pump in response to variations of flow in said conduit, means responsive to pressure in said conduit continuously urging said member in opposition to force applied thereto by increase in flow in said conduit.

9. The combination of claim 8 including an operative connection between said last means and said stroke varying means whereby said last means urges the stroke varying means into its minimum stroke position.

10. A liquid fertilizer injector for irrigation systems having an irrigation conduit comprising; a variable capacity reciprocating piston injection pump having a constant rate of operation, liquid intake means for said pump, liquid discharge means for said pump communicating with said conduit, a source of power for said pump, operating means connecting said source of power to said pump for positive actuation of said piston throughout its stroke, a flow responsive member having a face exposed to fluid in said conduit and movable by pressure variations thereof, means for controlling the time of actuation of said source of power by movement of said member.

References Cited in the file of this patent

UNITED STATES PATENTS

| | | |
|---|---|---|
| 914,440 | Miller | Mar. 9, 1909 |
| 1,790,708 | Hodges | Feb. 3, 1931 |
| 1,999,881 | Lowe | Apr. 30, 1935 |
| 2,080,872 | Paterson | May 18, 1937 |
| 2,148,671 | Allen | Feb. 28, 1939 |
| 2,227,646 | Hillmann | Jan. 7, 1941 |
| 2,649,203 | Hannibal | Aug. 18, 1953 |
| 2,683,622 | Dragon | July 13, 1954 |

FOREIGN PATENTS

| | | |
|---|---|---|
| 236,775 | Great Britain | July 16, 1925 |
| 686,164 | Great Britain | Jan. 21, 1953 |